United States Patent
Czech et al.

(10) Patent No.: US 11,633,653 B2
(45) Date of Patent: Apr. 25, 2023

(54) ILLUMINATED HOCKEY PUCK ASSEMBLY

(71) Applicants: Stephen Czech, Woodbury, MN (US); Matthew Czech, Woodbury, MN (US)

(72) Inventors: Stephen Czech, Woodbury, MN (US); Matthew Czech, Woodbury, MN (US)

(*) Notice: Subject to any disclaimer, the term of this patent is extended or adjusted under 35 U.S.C. 154(b) by 0 days.

(21) Appl. No.: 17/868,191

(22) Filed: Jul. 19, 2022

(65) Prior Publication Data
US 2023/0058768 A1    Feb. 23, 2023

Related U.S. Application Data

(63) Continuation-in-part of application No. 17/405,481, filed on Aug. 18, 2021, now Pat. No. 11,504,594.

(51) Int. Cl.
*A63B 67/14* (2006.01)
*A63B 69/00* (2006.01)

(52) U.S. Cl.
CPC .......... *A63B 67/14* (2013.01); *A63B 69/0024* (2013.01); *A63B 2225/74* (2020.08)

(58) Field of Classification Search
CPC .................. F21V 23/0435; A63B 69/0026
See application file for complete search history.

(56) References Cited

U.S. PATENT DOCUMENTS

| | | | |
|---|---|---|---|
| 4,846,475 A | 7/1989 | Newcomb | |
| 4,968,036 A | 11/1990 | Von Der Mark | |
| 8,764,592 B2 | 7/2014 | Vanderberg | |
| 9,126,094 B1* | 9/2015 | Davis | G07C 1/24 |
| 9,463,360 B1 | 10/2016 | Richard | |
| 10,486,033 B2 | 11/2019 | Weilong | |
| 2007/0275801 A1* | 11/2007 | Proulx | A63B 67/14 |
| | | | 473/588 |
| 2011/0292643 A1 | 12/2011 | Chen | |
| 2015/0297971 A1 | 10/2015 | Lindsey | |
| 2017/0059286 A1* | 3/2017 | D'Andrade | A63B 24/0021 |
| 2018/0104563 A1* | 4/2018 | Kounellas | A63B 63/004 |
| 2019/0152433 A1* | 5/2019 | Cumbo | G07C 9/00714 |
| 2020/0139203 A1* | 5/2020 | Lin | A63B 43/06 |
| 2020/0276487 A1* | 9/2020 | Hall | A63B 67/14 |
| 2020/0282286 A1* | 9/2020 | Kounellas | A63B 63/004 |
| 2021/0370151 A1* | 12/2021 | Kounellas | A63B 67/14 |

* cited by examiner

*Primary Examiner* — Eric T Eide

(57) ABSTRACT

An illuminated hockey puck assembly includes a housing having an outer surface including a top side, a bottom side, and a perimeter edge extending between the top and bottom sides. The illuminated hockey puck assembly has a weight, a shape, and a size comparable to a hockey puck. A lighting system is mounted within the interior and is encapsulated by the outer surface such that the lighting system is immobilized in the housing. The housing is translucent such that the housing is illuminated by the lighting system when the lighting system emits lights.

15 Claims, 7 Drawing Sheets

ILLUMINATED HOCKEY PUCK ASSEMBLY

CROSS-REFERENCE TO RELATED APPLICATIONS

I hereby claim the benefit under 35 U.S.C., Section 120 of U.S. application Ser. No. 17/405,481 filed Aug. 18, 2021.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to an enhanced visibility hockey puck device and more particularly pertains to a new enhanced visibility hockey puck device where the hockey puck is illuminated and the controls for the illumination are remote to the hockey puck. Further, the hockey puck comprises a body of unitary construction, which is translucent, for sealing illumination electronics and controls within the body to form a more durable and uniform structure that will mimic the weight and feel of a conventional hockey puck comprised of vulcanized rubber.

(2) Description of Related Art Including Information Disclosed Under 37 CFR 1.97 and 1.98

The prior art relates to enhanced visibility hockey puck devices that include illuminated elements but which further include openings for plugs, doors and the like which comprise the integrity of the puck. Moreover, these devices tend to require manual manipulation to turn a light emitter on or off, to charge or replace the battery, and typically include one light mode.

BRIEF SUMMARY OF THE INVENTION

An embodiment of the disclosure meets the needs presented above by generally comprising a housing having an outer surface including a top side, a bottom side, and a perimeter edge extending between the top and bottom sides. An illuminated hockey puck assembly, utilizing this housing, has a weight, a shape, and a size comparable to a hockey puck. A lighting system is mounted within the interior and is encapsulated by the outer surface such that the lighting system is immobilized in the housing. The housing is translucent such that the housing is illuminated by the lighting system when the lighting system emits lights.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
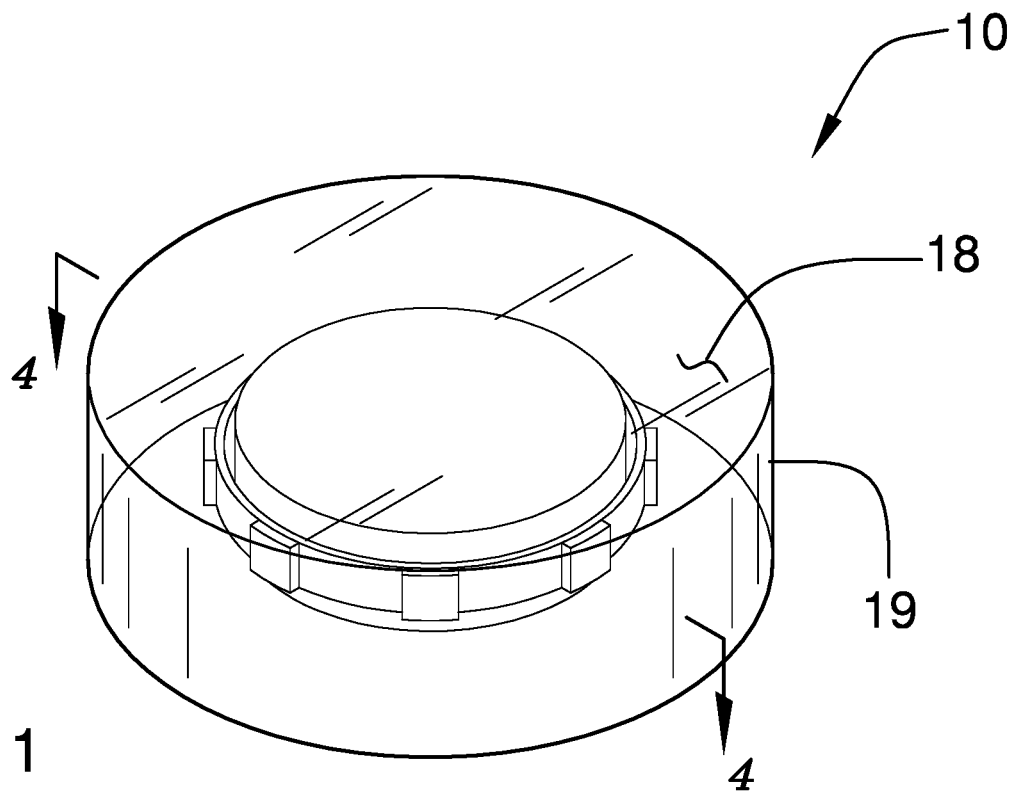
FIG. 1 is a top isometric view of an illuminated hockey puck assembly according to an embodiment of the disclosure.
Figure 2:
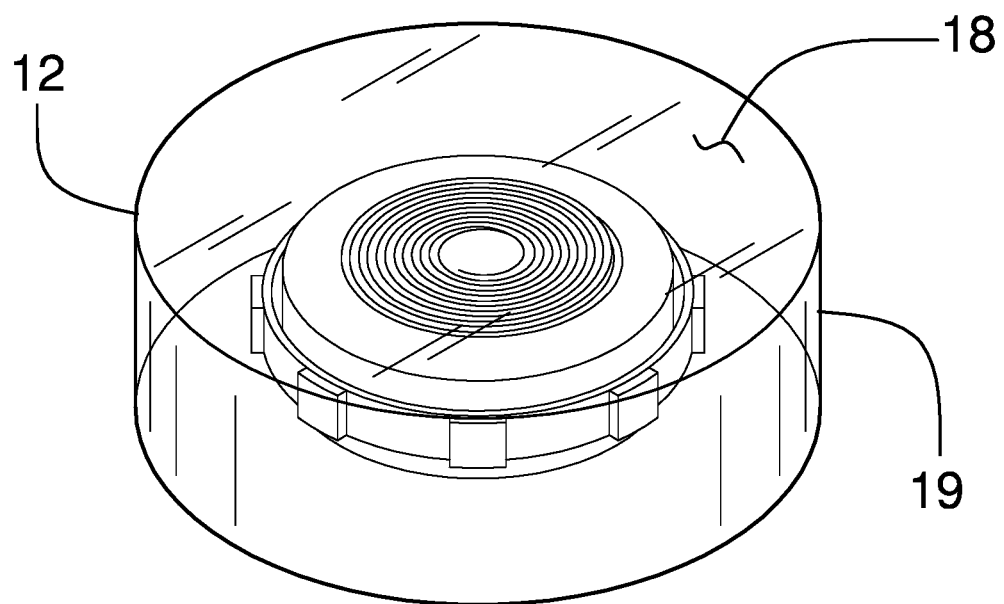
FIG. 2 is a bottom isometric view of an embodiment of the disclosure.
Figure 3:
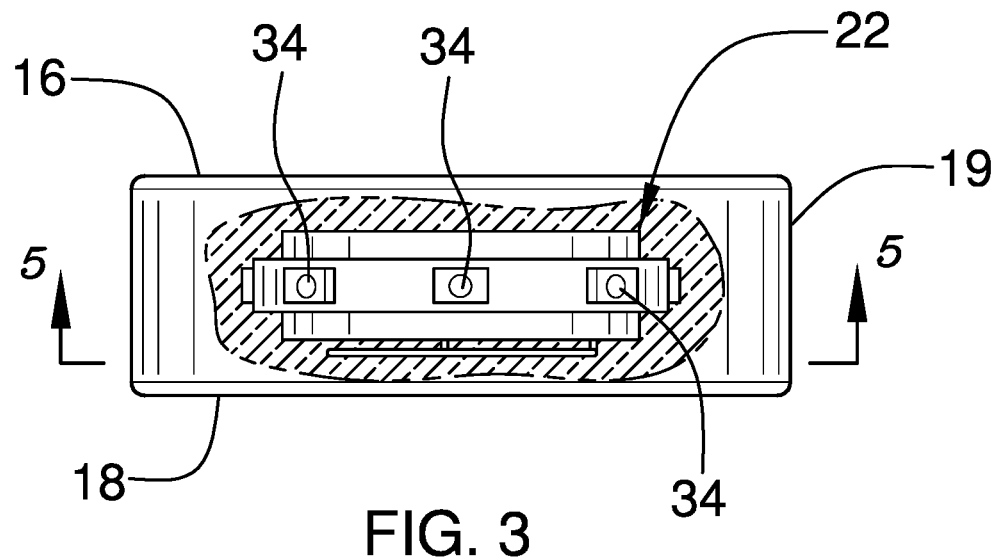
FIG. 3 is a side broken view of an embodiment of the disclosure.
Figure 4:
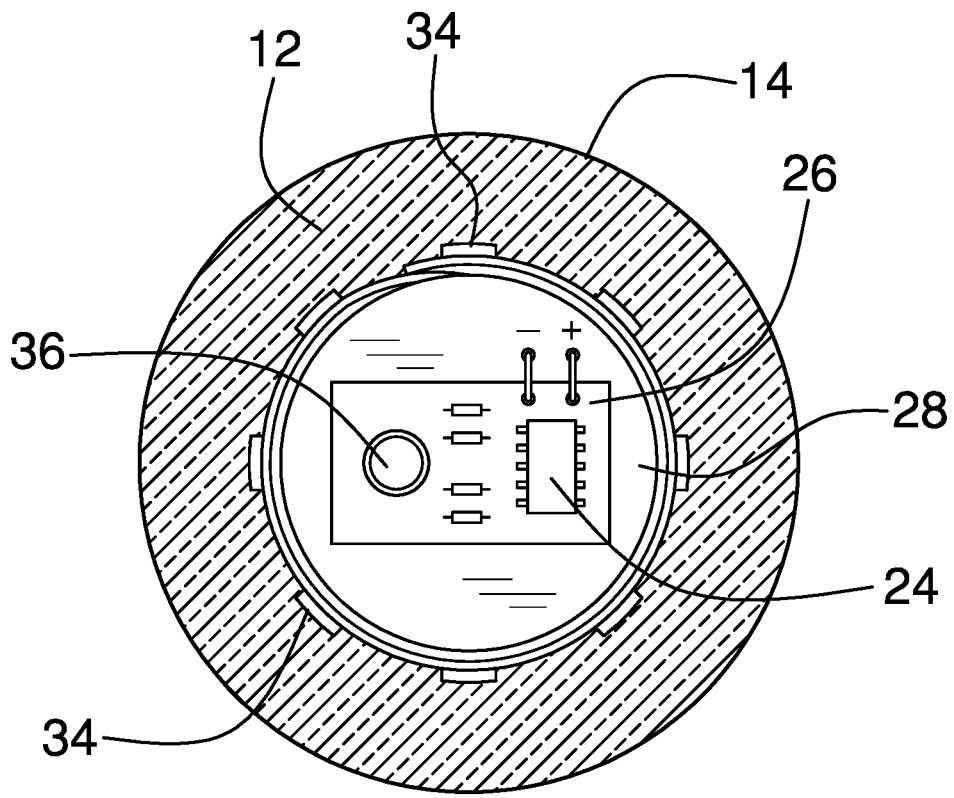
FIG. 4 is a cross-sectional view of an embodiment of the disclosure taken along line 4-4 of FIG. 1.
Figure 5:
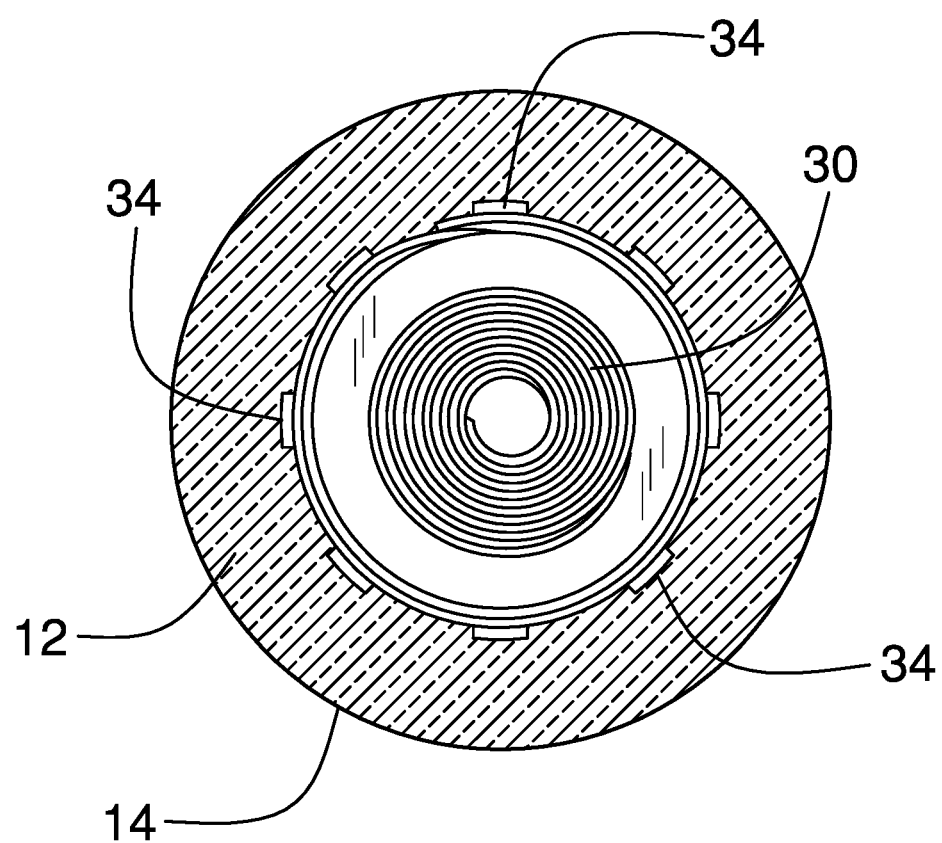
FIG. 5 is a cross-sectional view of an embodiment of the disclosure taken along line 5-5 of FIG. 3.

With reference now to the drawings, and in particular to FIGS. 1 through 9 thereof, a new enhanced visibility hockey puck device embodying the principles and concepts of an embodiment of the disclosure and generally designated by the reference numeral 10 will be described.

As best illustrated in FIGS. 1 through 9, the illuminated hockey puck assembly 10 generally comprises a housing 12 with an outer surface 14 including a top side 16, a bottom side 18, and a perimeter edge 19 extending between the top 16 and bottom 18 sides. The housing 12 is a unitary structure and has no openings therein accessible to an interior bounded by the outer surface as will be further discussed below. The illuminated hockey puck assembly 10 has a weight, a shape, and a size comparable to a conventional hockey puck used for playing ice hockey. A conventional hockey puck has a height equal to 1 inch, a diameter equal to 3 inches and a weight from 5.5 ounces to 6.0 ounces. The term "comparable" as used herein is defined as the illuminated hockey puck assembly 10 having measurements within 10% of the above parameters. It should be understood that the measurements above may deviate should the assembly 10 be used for, as an example, a child's puck where the standard weight may be 4 ounces. Alternatively, the weight, in particular, may be lowered if the assembly 10 is being used for recreation and entertainment to avoid injury caused by using a regulation weight hockey puck. However, the assembly 10 will still have a weight such that it will be useable in a manner typical to hockey pucks used for ice hockey.

A lighting system 20 is mounted within the interior of the housing 12. The lighting system 20 is encapsulated by the outer surface 14 such that the lighting system 20 is immobilized within the housing 12. The term "encapsulated" is defined herein to mean that the housing 12 generally abuts all outer surfaces of the lighting system 20. This will primarily be accomplished by an internal unit 22 of the lighting system 20 to be positioned within a mold and thereafter be covered with a fluidic elastomer such as a polyurethane to form the outer surface 14 and housing 12. The internal unit 22 will be typically centered to approximate an overall weight balanced structure. The housing 12 is translucent such that the housing 12 is illuminated by the lighting system 20 when the lighting system 20 emits lights. The polyurethane utilized will be translucent, and may be provided as essentially transparent, and will typically have a Type A Durometer Shore of between 80 and 95. This will compare to a conventional hockey puck having a Type A Durometer Shore of 90 to 91. Examples of suitable materials are available from Smooth-On, Inc. located 5600 Lower Macungie Road, Macungie, Pa. under the tradenames Clear Flex 95, KX Flex 90, and PCM-790.

Figure 6:
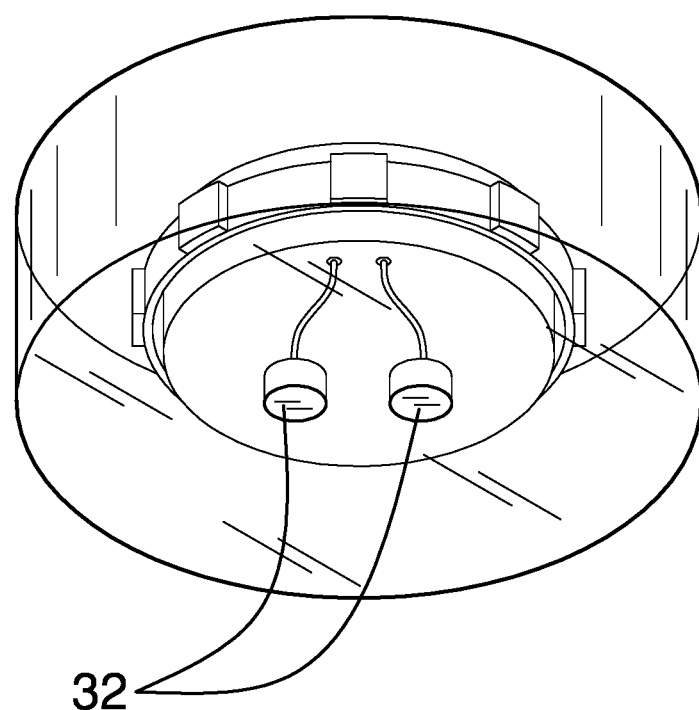
FIG. 6 is a bottom isometric view of another embodiment of the disclosure.
Figure 7:
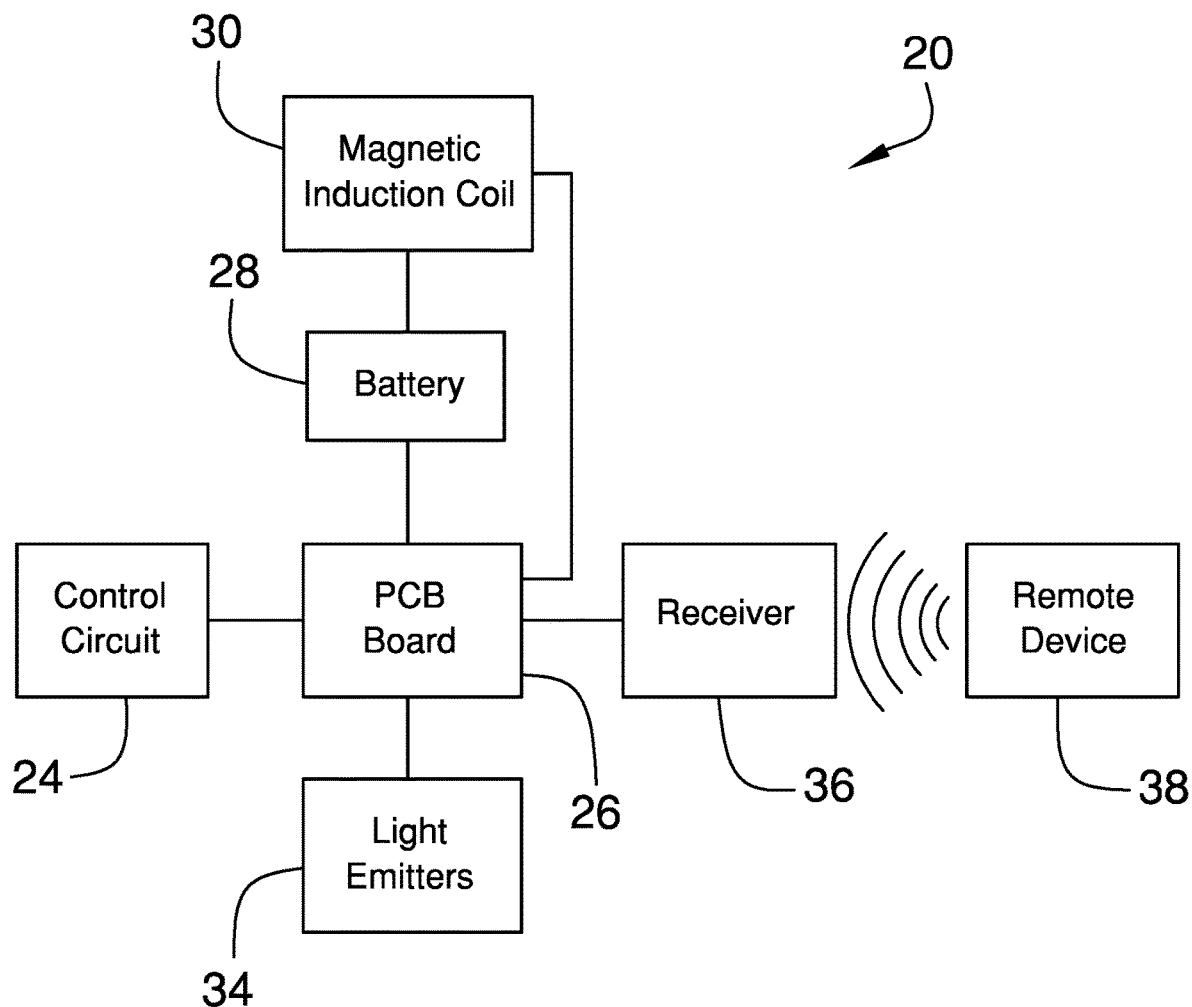
FIG. 7 is a schematic box diagram of an embodiment of the disclosure.

Generally, in one embodiment the lighting system 20 comprises a control circuit 24 mounted on a PCB board 26. A battery 28 is mounted to the PCB board 26 and electrically coupled to the control circuit 24. The battery 28 will be a rechargeable battery and will be recharged using magnetic induction and a magnetic induction coil 30 electrically coupled to the battery 28. This allows the housing 12 to remain solid and be free of any openings. As can be seen in FIG. 6, an embodiment of the assembly 10 includes contacts 32 that are flush with the outer surface of the housing for electrically connection to a recharging unit which do not require openings extending into the housing 12. These types of contacts 32, if used instead of magnetic induction, are preferred as they do not include the extension of plug openings into the housing 12 and therefore do not interrupt the integrity of the housing 12 and outer surface 14 when it is used as a hockey puck.

The lighting system further includes a plurality of light emitters 34 that are electrically coupled to the control circuit 24. As can be seen in the Figures, the light emitters 34 may be positioned outwardly from the PCB board 26 to facilitate the transmittal of light to and through the outer surface 14 of the housing 12. In one embodiment, the PCB board, battery, and light emitters 34 are each spaced at least 0.5 inches from the perimeter edge 19. Each of the light emitters 34 may comprise an LED (light emitting diode) light emitter, and each of the light emitters 34 may be configured to emit more than one color by each including a multi-colored LED.

The control circuit 24 is programmed to selectively turn the light emitters 34 on and off and may be further programmed to allow selection of a color to be emitted by the light emitters 34. In this manner, multiple patterns of lighting effects may be programmed into the control circuit and stored in a memory module either permanently or temporarily. The patterns may include solid non-strobing light emittance, various strobing/blinking affects, random coloring, coloring changes in pulses, variations in brightness, and multiple variations thereof.

A receiver 36 is electrically coupled to the control circuit 24. The receiver 36 is configured to receive a wireless signal from a remote device 38 to actuate the control circuit 24, to turn the lighting system 20 on and off, and to select a light pattern to be emitted by the light emitters 34. The receiver 36 may utilize any conventional wireless signals including, such as, WiFi and Bluetooth protocols. In some embodiments, the remote device 38 may comprise a stand-alone remote-control station, a tablet computer utilizing its own transceiver or a connected wireless router, a desktop computer or other similar type control station again utilizing its own transceiver or a connected wireless router, and cellular phones. Stand-alone remote controls may also utilize infrared transmitters wherein the receiver 36 is an infrared signal receiver. Cellular phones may be preferred remote devices 38 for their ability to download a software application which allows the transceivers built into the cellular phone (cellular, WiFi, and Bluetooth) to communicate with the receiver. Such an application, which would be similar to the programming of the other remote devices mentioned, would include the ability to turn on the lighting system and select a desired pattern of emitted light. The applications may also be utilized to send new or non-retained patterns to the control circuit 24.

In another embodiment of the assembly 10, the control circuit 24 further includes at least one capacitive sensor 40 being mounted within the housing 12 and being electronically coupled to the control circuit 24 to selectively actuate the lighting system 20. The capacitive sensor 40 may be used in conjunction with, or in lieu of, the remote device 38, and may include an embodiment which does not include the receiver 36 and remote device 38. The use of a capacitive 40 sensor allows the user to actuate the assembly 10 with actions similar to pressing a button while ensuring that there are no exposed actuators which might otherwise be damaged during usage of the assembly 10. The capacitive sensor 40 is conventional and detects a change to its electric field when interrupted by a person's touch.

Figure 8:
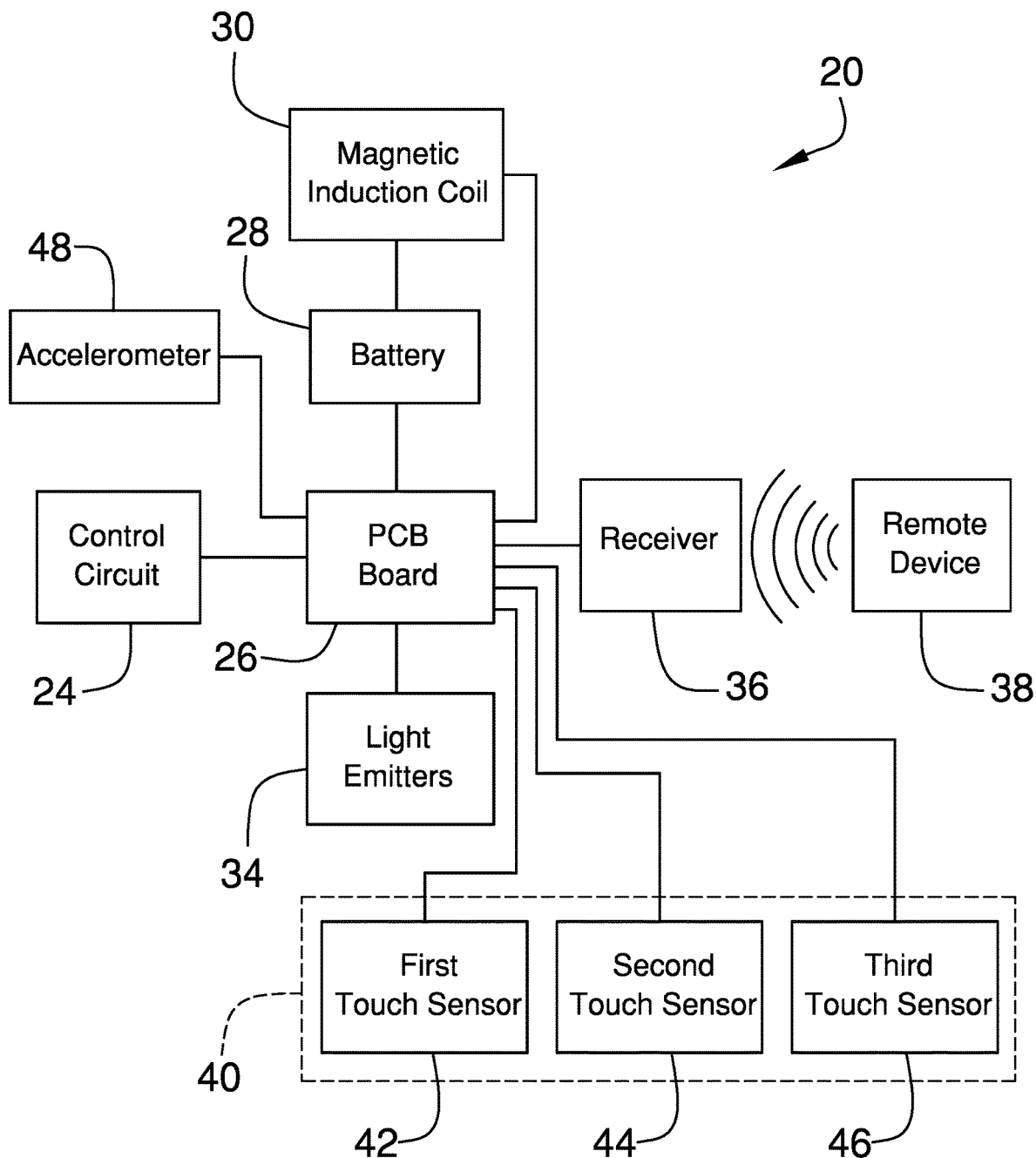
FIG. 8 is a bottom isometric view of yet another embodiment of the disclosure.
Figure 9:
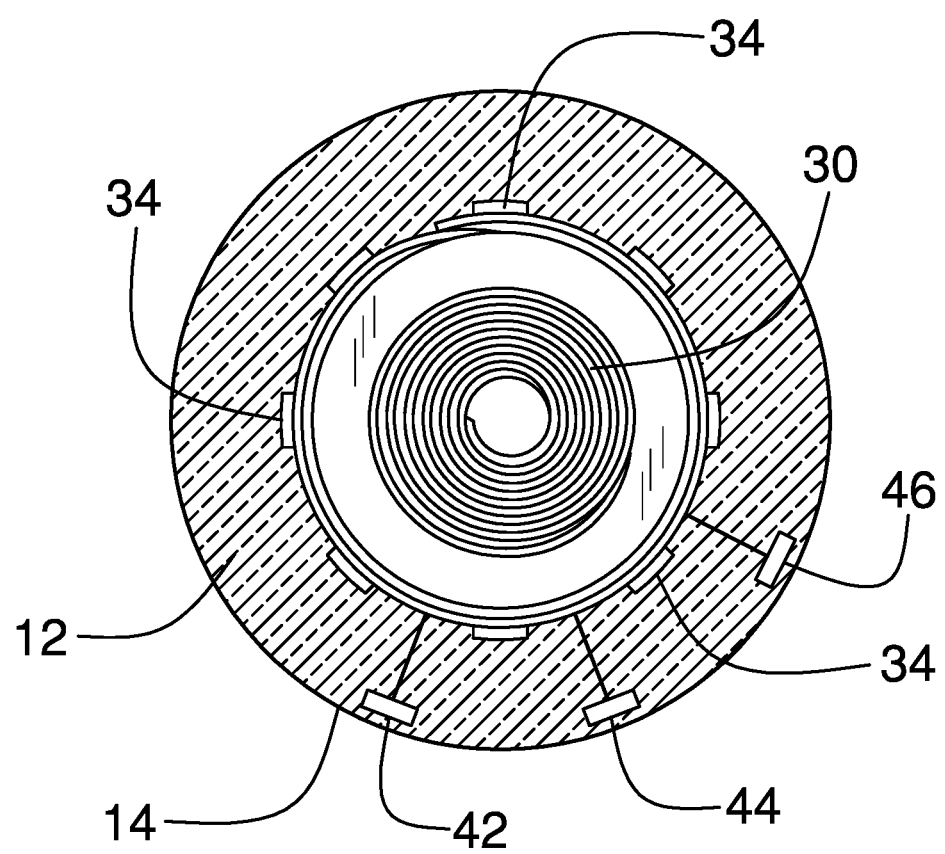
FIG. 9 is a schematic box diagram of the embodiment of the disclosure depicted in FIG. 8.

In some embodiments as shown in FIGS. 8 and 9, a plurality of capacitive sensors 40 may be utilized including a first touch sensor 42 and a second touch sensor 44. In such an embodiment, actuation of the lighting system 20 requires at least two of the capacitive sensors 40 being simultaneously actuated. This will more readily inhibit accidental actuation of the lighting system 20. If the plurality of capacitive sensors 40 includes a third touch sensor 46, the control circuit 24 will be programmed such that actuation of the lighting system 20 is prevented when more than two of the capacitive sensors 40 are simultaneously actuated.

For an exemplary embodiment, the actuation of at least two of the capacitive sensors 40 for a selected amount of time defines a power on time which turns on the light emitters 34. Likewise, when the assembly 10 has been turned on, actuation of at least two of the capacitive sensors 40 for a selected amount of time defines a power off time which turns off the light emitters 34. Each of the power on and power off times will typically be at least 1.0 seconds and no more than 5.0 seconds.

The control circuit 24 will be programmed to allow a user to cycle through various light emitting options by continuously actuating one of the capacitive sensors 40 while tapping a second one of the capacitive sensors 40. Each tap of a second one of the sensors 40 will allow cycling through pre-programmed lighting modes of the light emitters 24.

To prevent unwanted actuation, an accelerometer 48 is mounted within the housing and is electrically coupled to the control circuit 24. The accelerometer 48 disables the plurality of capacitive sensors 40 for a predetermined amounted of time when the accelerometer 48 detects a threshold acceleration. Thus, the accelerometer 48 prevents the capacitive sensors 40 from being accidentally actuated while the housing 12 is being used during play or handled in between plays. The amount of time after detected acceleration to the capacitive sensors 40 being usable may be determined upon need though this time is typically at least equal to 5.0 seconds. To prevent battery drainage, the lighting system 20 and/or light emitters 34 may be deactivated when the accelerometer 48 has not detected the threshold acceleration for a predetermined amount of time which will usually be at least 30.0 seconds. Moreover, the control circuit 24 may be programmed to re-activate the light emitters 34 when the threshold acceleration has been achieved if the control circuit 24 was not previously turned off, such as with actuation of two of the capacitive sensors for the power off time. If the accelerometer 48 does not detect the threshold acceleration for an extended amount of time, such as at least 5.0 minutes, the control circuit 24 may be programmed to initiate a power down cycle turning the control circuit 24 and, therefore, the lighting system 20, off.

It should be understood that the accelerometer 48 may measure both acceleration and deceleration to account for the housing 12 stopping abruptly, being struck while already moving, and for hitting walls around an ice rink. Consequently in most instances, the threshold acceleration will be either greater than about 4.47 m/s$^2$ or less than −4.47 m/s$^2$. The threshold acceleration may be different for the allowance of actuation of the capacitive sensors 40 compared to deactivation of the lighting system 20 and may be adjusted accordingly. The threshold acceleration dictated herein was found to be sufficient assuming acceleration of the housing 12 from 0 m/s to 4.47 m/s (10 mph) over a time span of 0.05 seconds (approximate time a hockey puck is on a hockey stick while being struck). Depending on the age range of the players using the assembly 10, this threshold acceleration may be increased or decreased as needed.

The above provides an assembly 10 to be used in a conventional manner to play hockey or hockey related games whereby the assembly 10 is struck with a conventional hockey stick. However, the assembly 10 may be illuminated with the light emitters 34 for better visibility, particularly while playing in the dark, and further can add amusement to the sport of playing hockey or challenge games utilizing a hockey puck-like device that can be struck by a hockey stick.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An illuminated hockey puck assembly comprising:
    a housing having an outer surface including a top side, a bottom side, and a perimeter edge extending between the top and bottom sides, the illuminated hockey puck assembly having a weight, a shape, and a size comparable to a hockey puck;
    a lighting system being mounted within the interior, the lighting system being encapsulated by the outer surface such that the lighting system is immobilized in the housing, the housing being translucent such that the housing is illuminated by the lighting system when the lighting system emits lights;
    the lighting system including:
        a control circuit for the lighting system for controlling light emitted by the lighting system; and
        at least one capacitive sensor being mounted within the housing and being electronically coupled to the control circuit to selectively actuate the lighting system, wherein the at least one capacitive sensor comprises a plurality of capacitive sensors, a first touch sensor and a second touch sensor of the plurality of capacitive sensors is defined, wherein actuation of the lighting system requires at least two of the capacitive sensors being simultaneously actuated.

2. The illuminated hockey puck assembly according to claim 1, wherein a third touch sensor of the plurality of capacitive sensors is defined, wherein actuation of the lighting system is prevented when more than two of the capacitive sensors are simultaneously actuated.

3. The illuminated hockey puck assembly according to claim 1, wherein the lighting system includes:
    a battery being electrically coupled to a control circuit;
    a plurality of light emitters being electrically coupled to the control circuit, each of the light emitters comprising an LED light emitter; and
    wherein each of the light emitters is configured to emit more than one color, the control circuit being programmed to selectively turn the light emitters on and off, the control circuit being programmed to allow selection of a color to be emitted by the light emitters.

4. The illuminated hockey puck assembly according to claim 3, wherein actuation of at least two of the capacitive sensors for a selected amount of time defining a power on time turns on the light emitters.

5. The illuminated hockey puck assembly according to claim 4, wherein actuation of at least two of the capacitive sensors for a selected amount of time defining a power off time turns off the light emitters.

6. The illuminated hockey puck assembly according to claim 5, wherein continuous actuation of at least one of the capacitive sensors while tapping of second one of the capacitive sensors cycles through pre-programmed lighting modes of the light emitters.

7. The illuminated hockey puck assembly according to claim 6, further including an accelerometer being mounted within the housing and electrically coupled to the control circuit, the accelerometer disabling the plurality of capacitive sensors for a predetermined amounted of time when the accelerometer detects a threshold acceleration.

8. The illuminated hockey puck assembly according to claim 7, Wherein the light emitters are deactivated when the accelerometer has not detected the threshold acceleration for a predetermined amount of time.

9. The illuminated hockey puck assembly according to claim 8, wherein the housing is a unitary structure and having no openings therein accessible to an interior bounded by the outer surface, the lighting system being spaced from the outer surface.

10. The illuminated hockey puck assembly according to claim 6, further including a receiver being electrically coupled to the control circuit, the receiver being configured to receive a wireless signal from a remote device to actuate the control circuit and turn the lighting system on or off.

11. The illuminated hockey puck assembly according to claim 6, wherein the lighting system includes a battery configured to be wirelessly charged.

12. The illuminated hockey puck assembly according to claim 10, wherein the receiver is configured to receive a wireless signal for selecting one of a plurality of light patterns to be emitted by the light emitters.

13. The illuminated hockey puck assembly according to claim 12, wherein the housing is a unitary structure and having no openings therein accessible to an interior bounded by the outer surface, the lighting system being spaced from the outer surface.

14. The illuminated hockey puck assembly according to claim 3, further including an accelerometer being mounted within the housing and electrically coupled to the control circuit, the accelerometer disabling the plurality of capacitive sensors tier a predetermined amounted of time when the accelerometer detects a threshold acceleration.

15. The illuminated hockey puck assembly according to claim 14, wherein the light emitters are deactivated when the accelerometer has not detected the threshold acceleration for a predetermined amount of time.

\* \* \* \* \*